> United States Patent Office 3,577,341
Patented May 4, 1971

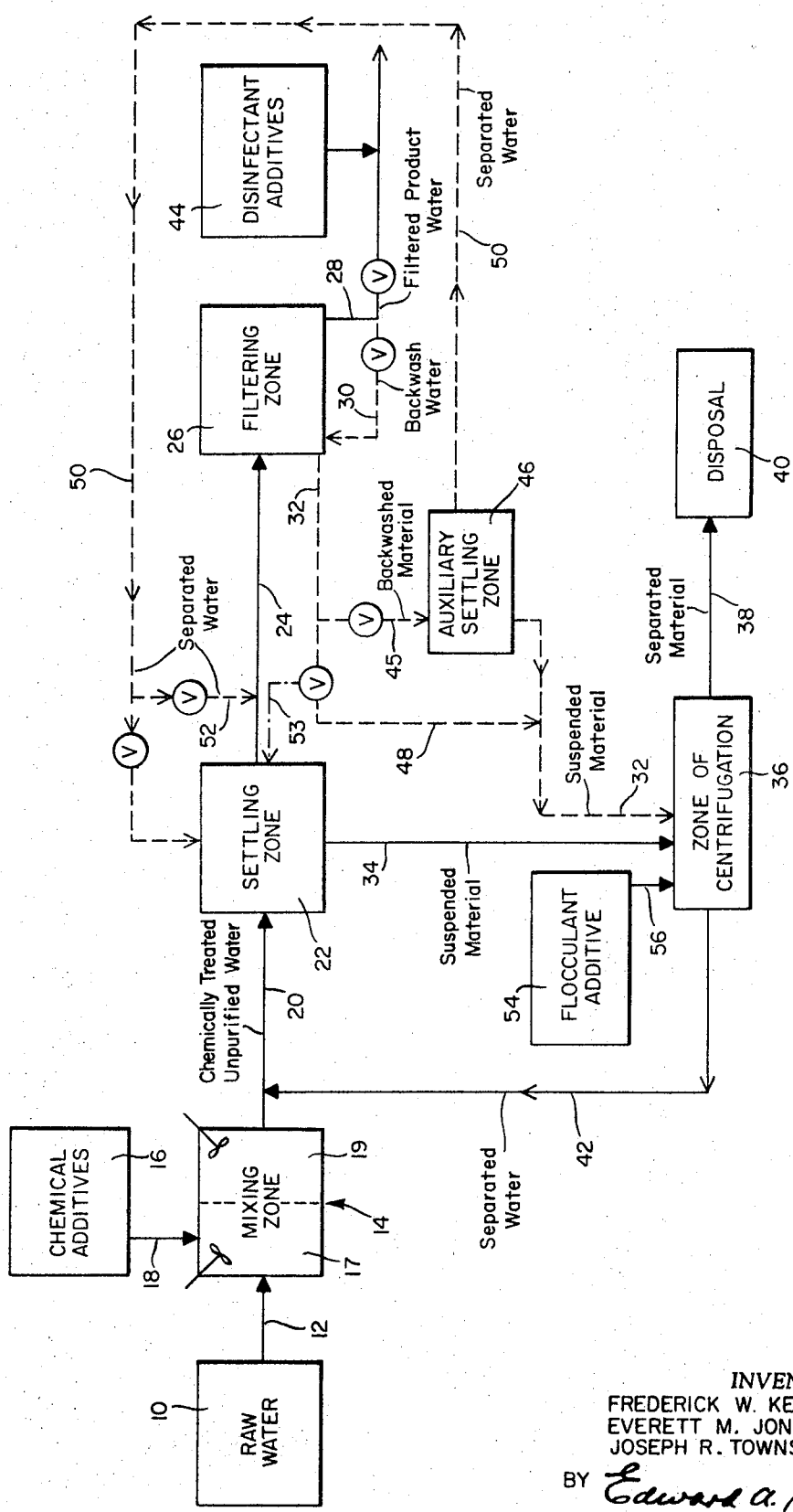

3,577,341
WATER TREATMENT
Frederick W. Keith, Jr., Gladwyne, Everett M. Jones, Ardmore, and Joseph R. Townsend, Jr., West Chester, Pa., assignors to Pennwalt Corporation
Filed Oct. 18, 1968, Ser. No. 768,848
Int. Cl. C02b 1/20
U.S. Cl. 210—53     13 Claims

ABSTRACT OF THE DISCLOSURE

In water treatment, immediately following treating with chemicals and settling of sedimented material, the latter no longer need be returned as a pollutant to a water course, or otherwise disposed of. Rather, the sedimented material is centrifugally concentrated for convenient disposal in compact form and the water separated therefrom may be reprocessed.

---

This invention relates to a method and an apparatus for treating water undergoing treatment in purifying plants, and is directed toward convenient and economical disposal of sedimented material removed during water treatment.

In many localities, it has been the practice of water purifying plants to extract water from a water course, treating it and returning removed and manufactured impurities to the water course at a downstream location. Such practices have been accepted in the past, on the theory that the water treatment plant has merely removed some pure water for the public good. In actuality, downstream riparians receive water with an increased concentration of impurities, partly due to the return of impurities, and partly because of the addition of such additives as carbon and alum during processing. In densely populated areas especially, greater attention is now being given to pollution problems and some existing water treatment plants are being required to discontinue the practice of discharging large volumes of process waste into water courses.

According to the present invention, it is intended to retain the conventional steps and apparatus for mixing chemical additives into the raw water, settling sedimented material from the mixture and filtering the separated water prior to distribution. However, the sedimented material is now centrifugally concentrated for convenient and economical disposal, as may also be undesired material backwashed from filter beds, and the centrifugally separated water is recovered for reprocessing.

An example of the practice of the invention will now be described in connection with the accompanying drawing, in which the single illustration is a schematic view of a plant for use in carrying out the process. Solid lines indicate flow for the basic purification procedure, whereas broken lines indicate flow for treatment of backwash.

Referring to the drawing, a river, stream or water course provides a source 10 of raw water which is delivered through a line 12 to a mixing zone 14. In the mixing zone 14 pre-chemical treatment of the raw water is accomplished by the introduction thereto of one or more chemical additives from tank 16 through a line 18. Although not shown, a separate tank 16, line 18, and suitable metering valves may be provided for each chemical additive to be so introduced.

The chemicals added to the raw water are suited for the correction of such deficiencies as turbidity, dissolved or soluble impurities, taste, odor, color, bacteria, hardness, acidity, alkalinity, pH, and miscellaneous substances. The additives usually comprise one or more chemicals from the group consisting of potassium permanganate, aluminum sulfate, ferric sulfate, lime, carbon, chlorine, ammonia, sodium hydroxide, and soda ash.

Various chemicals will combine with water or the constituents present therein to produce a flocculent or gelatinous precipitate which aids clarification during sedimentation. During formation and settling of floc, many finely divided suspended particles, including microorganisms, are collected and some of the dissolved substances, particularly those that impart color, are absorbed. Of the chemicals used for this purpose, aluminum sulfate (alum) is employed most extensively, the amounts used in practice varying from less than one grain to approximately five grains per gallon. Ferric salts are acceptable substitutes, especially if the pH of the water is not suitable for alum coagulation. Both aluminum and iron form gelatinous precipitates, and the extent to which these added salts participate in the precipitation will depend to a large extent upon the pH of the water. Since the amount of precipitate and the efficiency of removal of suspended matter are dependent upon a favorable pH, it is often possible to improve the effectiveness of the alum treatment by prior adjustment of pH.

In some places it has been found desirable to prechlorinate the water before adding the coagulating chemicals so as to kill some of the organisms that may be responsible for taste and odors. The killed organisms are more easily removed by the coagulating chemicals than the live ones, and if they are not removed in the settling tanks with the floc, they will be carried on to the filters where they get caught by the filters and eventually die and disintegrate, and liberate the compounds responsible for the taste and odors.

Activated carbon has been found to be an effective agent for removal of taste and odors as well as color, and in some communities it has been found desirable to add activated carbon to the water for this purpose.

It is contemplated that within the mixing zone 14 there will be a first region 17 for the introduction and quick mixing of the chemical additives and also a second region 19 for the slow mixing of the chemicals under agitation in order to prevent settling and provide a suitable period of time for the desired chemical reaction.

The chemicals must be added to the water in the mixing zone 14 as it flows into the treatment plant, necessitating a continuous feed, proportioned to the flow of water. In some cases, each additive is dissolved in a small amount of water to give a strong solution and then fed into the raw water. In other cases, dry powders are mixed with incoming waters by proportioning machines. Immediately after chemicals have been added at region 17 there is a rapid or violent stirring, so as to mix the chemicals uniformly with the water. After this, the water enters region 19, where it remains for a period of from 15 to 20 minutes and where it is stirred slowly. During this slow agitation precipitate forms and increases in size. Slow mixing also permits the precipitate to pass through the water and to occlude more of the suspended matter and also adsorb more of the dissolved substances. This agitation can be accomplished either by having the liquid flow through a narrow channel, over and under a series of baffles, or having it mixed in a rectangular tank by mechanical devices. If this period of mixing is not employed, a larger quantity of chemical has to be added to accomplish the desired results.

The chemically treated unpurified water is delivered from the mixing zone 14 by a line 20 to a settling zone 22 where gravitational separation or sedimentation of solids takes place. Separated water is withdrawn from an upper region of the settling zone 22 and conducted through a line 24 to a filtering zone 26, while suspended solids gravitate to a lower region of the settling zone 22.

More specifically, after the floc has formed and after the period of slow mixing in zone 14, the water is run via line 20 into the settling zone 22, i.e. settling basins where the precipitate can be allowed to settle. One of several types may be employed. One is an intermittent type which operates on a fill-and-draw basis, but a continuous type is now generally used in which the water flows through at a slow rate.

In the continuously operating basins, the water is run in at one location and allowed to pass slowly through the chamber and emerge from another location as clarified water. In many installations these basins are constructed as to depend upon manual operation for the removal of the solids, which is done from time to time by taking the unit out of service, draining the water, draining and flushing the bottom, and cleaning the basin before putting it back into service. To facilitate such cleaning, the bottoms of the basins are generally constructed so that they slope toward the point where there are openings into the waste line 34. More modern settling basins are provided with mechanical scrapers that continually push the solids into sludge pits where they can be removed with pumps. The mechanized tanks have the advantage that they can be kept in continuous service, and are particularly desirable in installations where a large amount of sediment must be removed.

As mentioned previously, clarified water is delivered from the settling zone 22 or basin through a line 24 to a filtering zone 26 by gravity or by pumps (not shown). The filtering zone 26 may consist of filtering sand beds and/or in some instances a resin bed adapted to accomplish softening of hard water. The primary purpose of the filtering zone 26 is to effect final separation of impurities and to temporarily retain them in the bed, while filtered product water is discharged through a line 28.

The construction of the filtering zone 26 is preferably that of a rapid media filter, e.g. filter beds of sand, carbon, fine coal, limestone, ion exchange resins, synthetic plastic resins, etc. With rapid media filters it may not be possible to obtain adequate clarification by filtration alone, and therefore prior treatment with coagulants is desirable. Here, also, it is preferable to leave some of the precipitate in the water as it enters the filters in order to build up a film on the surface of the media to aid in the removal of suspended matter and bacteria. This means that the sludge accumulates rather rapidly and that the media has to be cleaned often. In fact backwashing may be necessary every 6 to 48 hours. During backwashing filtered water is pumped via line 30 in reverse direction back through the media from the underdrains, fed by line 28, under sufficient pressure to bring about a slight separation of the media causing the media to rise in the bed, become agitated, and to separate the entrapped turbidity from the media. The cleaning is optionally facilitated by a mechanical mixing of the media while it is being backwashed or by blowing air into the bed at this time. The backwash water with the sludge it removes is run into troughs placed at a proper level above the media and from there is drained into the waste line 32. Generally after a few minutes of backwash the water will come through clean and the bed is then put back into service.

In a single plant there will be many of these individual units comprising the filtering zone 26, so constructed and arranged that any one unit can be taken out of service without interfering with the operation of the others. The removal of bacteria by the rapid media filter is effective and efficient with proper coagulation preceding the filtration.

Since filters cannot be depended upon to remove all the pathogenic organisms that might be present, it is necessary as an extra safeguard to introduce some disinfectant into the water after it emerges from the filtering zone 26 and before it is put into the distribution system. The available and permissible disinfectants are chlorine, hypochlorite, ozone, and ultraviolet light. Chlorine is the agent used, in most plants in the form of a strong solution of chlorine in water, which has been produced in chlorinators that dissolve gaseous chlorine in the proper proportions. As shown in the drawing, this solution is added from a tank 44 to line 28 as the water emerges from the filter zone 26. The gaseous chlorine in turn is obtained from liquid chlorine in cylinders or tank cars. Time is required for the chlorine to kill the pathogenic bacteria, and, therefore, it is desirable to retain the water in reservoirs (not shown) for a period of time before it is pumped into the distribution system. The quantity of chlorine required will vary from time to time, depending upon the nature of the water, the amount of organic matter present, and the residual that needs to be maintained.

In a conventional water purification plant both backwashed material from line 32 and also suspended material taken from the bottom of the settling zone 22 by a line 34 are discharged into the water course at a downstream location. As indicated previously, however, such practice pollutes the water course downstream of the water purification plant to the dissatisfaction of downstream water users.

According to the present invention, an aqueous solution or suspension of removed material from the settling zone 22 is fed from the waste line 34 to a zone of centrifugation 36, the latter being also referred to herein as a locus of centrifugal force. This feed from the bottom of the settling zone 22 is subjected to centrifugation in the zone 36 preferably by forces ranging between 900 and 3000 times the force of gravity, as a result of which it is separted into an inner layer comprising cleaned water and also an outer layer comprising concentrated undesirable material in an aqueous solution or suspension. The separated material concentrate taken from the outer layer of the zone 36 is discharged through a line 38 to any suitable point of disposal 40. This material concentrate is still of flowable consistency, having a solids concentration which may be in the range of between 10 and 25%. This concentrate resulting from centrifugation may be compared with sludges produced by settling in simple gravitational forces and having concentrations ranging from 1½ to 5%, with an average of about 3½%. It can be seen therefore, that cetrifugation in zone 36 is highly effective for concentrating suspended solids in water treatment processes.

The cleaned, separated water is also separately discharged, from the inner layer of the zone of centrifugation 36, and preferably passed through line 42 into line 20 ahead of the settling zone 22 for recycling therethrough, although discharge to a downstream location is an alternative contemplated by this invention for some water treatment plants. The cleaned, separated water has typically 95% of the suspended solids removed therefrom by centrifugation and it constitutes the major portion of the fluid discharged from the centrifugation zone 36. This cleaned, separated water which is recycled is a large percentage of the volume of feed deliveerd to the centrifugation zone 36 by line 34, and would otherwise be discharged with the undesired material in conventional or other processes.

The sludge resulting from backwashing the filter beds of the filtering zone 26 is now also delivered from waste line 32 to the zone of centrifugation 36 according to the present invention. Preferably this is accomplished by the intermediate step of passing the sludge via line 45 through an auxiliary settling zone 46 constructed as a basin similar to the settling zone 22, previously described at length herein; but, less desirably, it is possible to deliver the sludge directly to the zone of centrifugation through a by-pass line 48 connected to opposite end portions of the waste line 32. Separated water from the auxiliary zone 46 is recycled by passage through line 50 ahead of the filtering zone 26, preferably to the primary settling zone 22, although with a relatively low concentration of residual suspended material the separated water might suitably be introduced through a line 52 to the line 24 leading to the inlet of the filtering zone 26. In any event, the bulk of the suspended material is delivered to the zone of centrifugation 36 for concentration and disposal, while centrifugally separated water is separately discharged, in the manner previously described with respect to feed from the waste line 34.

Optionally, instead of passing the backwashed material via line 45 through auxiliary settling zone 46 or bypassing it via line 48, all or part of the backwashed material may be conducted by means of a line 53 to the settling zone 22. Line 53 is shown in phantom in the drawing.

As a further option, a polyelectrolyte material or other suitable flocculent may be introduced to the zone of centrifugation 36 from a tank 54 through a tube 56 in order to increase the rate of solids recovery from the feed. With this provision the rate of recovery can be increased from about 95% to approximately 98%.

Although the invention is not so limited, a suitable centrifuge for carrying out the present invention is of the general type shown and described in the copending application of William J. Kirkpatrick, Ser. No. 593,338, filed Nov. 10, 1966, now U.S. Pat. No. 3,407,999, granted Oct. 29, 1968, and assigned to the assignee of the present invention. This type of centrifuge preferably includes an imperforate centrifuge bowl mounted for rotation about a vertical axis, with means for introducing the feed to the bowl, although a perforated bowl can be used for some applications. During rotation of the bowl, clarified liquid flows over an annular lip at one end, e.g. the upper end, of the bowl, while solids build up on the peripheral wall on the bowl. When solids are accumulated to a predetermined level a non-rotating skimmer tube is actuated either manually or automatically for outward movement whereby the flowable solids enter the mouth of the tube and are discharged from the bowl through the tube. A knife which is movable in a manner similar to the tube may be employed for shaving compacted solids from the extreme periphery of the bowl at low speed, and the shavings may be discharged through an axial opening at the bottom of the bowl. The invention partly involves a new use for apparatus of this general type.

Fro the foregoing it can be seen that it is possible to treat water in a plant which not only produces pure water, but which also disposes of waste in a more efficient, economical and convenient manner conforming to the antipollution requirements of local laws and regulatory agencies. Sludge concentration and/or recycling of clarified water reduces the volume of disposable material, also makes practicable the recovery of chemicals from sludge concentrate and the recycling of separated water. Such recycling of separated water effectively increases the volumetric output of clarified water from a given plant, for example in the order of 5 to 10%. At the same time the need for expensive disposal lagoons or basins or alternatively the problem of carrying away large volumes of essentially liquid waste by truck or other means is eliminated.

What is claimed is:

1. In a method for treating raw water to remove undesirable material therefrom, which comprises (a) passing the raw water from a raw water source through a mixing zone and there (b) mixing it with one or more additives, (c) feeding the resultant mixture to a settling zone where sedimented material is separated from the water, (d) passing the separated water from the settling zone to a filtering zone and there (e) further removing undesirable material therefrom, and (f) passing the filtered water from the filtering zone, there being a flow path from the raw water source through said mixing zone and said settling zone to a locus of centrifugal force, that improvement which comprises (g) feeding an aqueous solution or suspension of material from the settling zone to said locus of centrifugal force and there (h) separating it into an inner layer comprising cleaned water and an outer layer comprising concentrated undesirable material in an aqueous suspension of flowable consistency, (i) separately discharging said cleaned water and said concentrated material from the respective layers and said locus, and (j) recycling the cleaned water separately discharged from said locus of centrifugation and mixing it with the flow through said flow path.

2. A method according to claim 1 wherein the centrifugal force in said locus subjects matter therein to forces in the range of between 900 to 3000 times the force of gravity.

3. A method according to claim 1, further including the step of introducing a flocculent to said zone of centrifugation.

4. A method according to claim 1, wherein the recycled cleaned water separately discharged from said locus of centrifugation is mixed with the water being treated ahead of said settling zone.

5. A method according to claim 1, comprising also the steps of: (k) discontinuing the flow of separated water from the settling zone to at least a portion of the filtering zone, (l) passing filtered water in reverse direction through said portion of the filtering zone to backwash accumulated material therefrom, (m) feeding the backwashed material to said locus of centrifugal force for separation into an inner layer of cleaned water and an outer layer of concentrated undesirable material, and (n) separately discharging the cleaned water and said concentrated material from the respective layers and said locus.

6. A method according to claim 5, comprising also the steps of recycling the cleaned water derived from the backwashed material and separately discharged from said locus of centrifugation and mixing it with the flow through said flow path.

7. A method according to claim 5 wherein the step (m) of feeding backwashed material includes flowing the backwashed material from said filtering zone first through an auxiliary settling zone for separating the same into a suspension of settled solids and separated water, and wherein the recycling of separated water is to a point ahead of said filtering zone for mixture with the water being treated, and then delivering the suspension of settled solids to said locus of centrifugal force.

8. A method according to claim 5 wherein the step (m) of feeding backwashed material includes flowing the backwashed material from said filtering zone to said settling zone for processing with the raw water and additive mixture.

9. Water treatment apparatus comprising the combination with: means for mixing chemical additives with raw water to produce a mixture thereof, a settling basin in which undesired material is sedimented from said mixture, means for delivering water from a source or raw water to said mixing means and from said mixing means to said settling basin, a media filter for separating residual sediment from said water, means for conducting separated water from said settling basin to said media filter, and means for discharging filtered water from said media filter, said delivering means and said feeding means defining with said mixing means and said settling basin a flow path between the raw water source and a centrifuge, of said centrifuge including a rotatably mounted solid bowl adapted to apply forces in the range of between 900 g. and 3000 g. on material delivered thereto, means for feeding sedimented material from said settling basin to said centrifuge, whereby said sedimented material is separated into a light component comprising clarified water and a heavy component comprising concentrated sediment, and fluid conducting means for recycling clarified water from said centrifuge to said flow path and mixing it with the flow therethrough.

10. Water treatment apparatus according to claim 9 wherein said fluid conducting means is connected to said delivering means for mixing the clarified water recycled from said centrifuge with water chemically treated by said mixing means.

11. Water treatment apparatus according to claim 9 further including means for backwashing said media filter with clarified water, and a conduit for conducting backwashed material from said media filter to said centrifuge.

12. Water treatment apparatus according to claim 11 further including an auxiliary settling basin in said conduit for sedimenting backwashed material and delivering the same through said conduit to said centrifuge and delivering settled water to said first mentioned settling basin for processing with said chemically treated raw water.

13. Water treatment apparatus according to claim 9 wherein said centrifuge bowl is perforated.

References Cited

Steel, E. W., Water Supply and Sewerage, 2nd Ed., 1947, McGraw-Hill, N.Y., pp. 274–275 (176).

Fair, G. M., et al., Water Supply and Waste-Water Disposal, 1954.

John Wiley & Sons, N.Y., pp. 755–758.

Woodruff, P. H., et al., Dewatering Activated Sludge By Two-Stage Centrifugation, Water and Sewage Works, vol. 114, November 1967, pp. 429–436.

MICHAEL ROGERS, Primary Examiner

U.S. Cl. X.R.

210—60, 73, 195, 202